(12) United States Patent
Schwarzer et al.

(10) Patent No.: US 10,280,500 B2
(45) Date of Patent: May 7, 2019

(54) PROCESS FOR CARBONITRIDING METALLIC COMPONENTS

(75) Inventors: Jochen Schwarzer, Witten (DE); Laszlo Hagymasi, Gerlingen (DE); Thomas Waldenmaier, Freiberg/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 528 days.

(21) Appl. No.: 13/643,027

(22) PCT Filed: Apr. 6, 2011

(86) PCT No.: PCT/EP2011/055359
§ 371 (c)(1),
(2), (4) Date: Jan. 7, 2013

(87) PCT Pub. No.: WO2011/131487
PCT Pub. Date: Oct. 27, 2011

(65) Prior Publication Data
US 2013/0126049 A1    May 23, 2013

(30) Foreign Application Priority Data
Apr. 23, 2010  (DE) .................. 10 2010 028 165

(51) Int. Cl.
*C23C 8/34* (2006.01)
*B32B 15/04* (2006.01)
(Continued)

(52) U.S. Cl.
CPC .............. *C23C 8/34* (2013.01); *B32B 15/04* (2013.01); *C23C 8/20* (2013.01); *C23C 8/24* (2013.01); *C23C 8/30* (2013.01)

(58) Field of Classification Search
CPC .................................................... C23C 8/34
See application file for complete search history.

(56) References Cited

U.S. PATENT DOCUMENTS 5,273,585 A   12/1993  Shoga et al.
6,325,867 B1  12/2001  Okita et al.
(Continued)

FOREIGN PATENT DOCUMENTS

DE    19909694    9/2000
DE    69831530    6/2006
(Continued)

OTHER PUBLICATIONS

International Search Report for Application No. PCT/EP2011/055359 dated May 23, 2011 (English Translation and Original, 4 pages).

*Primary Examiner* — Jenny R Wu
(74) *Attorney, Agent, or Firm* — Michael Best & Friedrich LLP

(57) ABSTRACT

In a process for carbonitriding metallic components (1), provision is made of at least one carburization phase (C1, C2), in which the metallic component (1) is carburized with a carbon-donating gas. In addition, provision is made of a nitriding phase (C1, C2, C3), which is assigned to the carburization phase (D1, D2) and precedes the carburization phase (D1, D2). Here, in the nitriding phase, the metallic component (1) is nitrided by means of a nitrogen-donating gas at least superficially at at least one surface region (4) of the metallic component (1). It is thereby possible to avoid an excessive concentration of carbon, and therefore component failure is prevented and it is possible to dispense with costly remachining steps, e.g. grinding.

5 Claims, 4 Drawing Sheets

(51) Int. Cl.
*C23C 8/20* (2006.01)
*C23C 8/24* (2006.01)
*C23C 8/30* (2006.01)

(56) References Cited

U.S. PATENT DOCUMENTS

2002/0166607 A1* 11/2002 Altena ................. C21D 1/76
                                                                148/218
2004/0187966 A1    9/2004  Yamaguchi et al.
2012/0103473 A1    5/2012  Foerster et al.

FOREIGN PATENT DOCUMENTS

| | | |
|---|---|---|
| EP | 1160349 | 12/2001 |
| JP | 55040843 | 3/1980 |
| JP | 2006028541 | 2/2006 |
| JP | 2006028541 A * | 2/2006 |

* cited by examiner

PROCESS FOR CARBONITRIDING METALLIC COMPONENTS

BACKGROUND OF THE INVENTION

The invention relates to a process for carbonitriding metallic components, in particular steel parts. Specifically, the invention relates to a process for carbonitriding metallic components of fuel injection systems of air-compressing, auto-ignition internal combustion engines or of an air-compressing, auto-ignition internal combustion engine. Furthermore, the process is also suitable for transmission components.

DE 199 09 694 A1 discloses a process for carbonitriding in vacuum processes without plasma assistance. In the known process, molecular nitrogen is used as the donating gas, with a surface layer of a steel part being enriched with nitrogen at the end of the process. As the last step, a vacuum carburization process is followed by the carbonitriding step with nitrogen as the donor. The process pressure in this step is higher than the pressure in the carburization step. In this respect, the nitrogen donor can be added not only in the last process step, but also throughout the process.

The process known from DE 199 09 694 A1 has the disadvantage that, on account of the high carbon concentration which acts over relatively long times, carbides which can no longer dissolve during the further heat treatment can form in the base material. Depending on the loading, carbides close to the surface lead to premature component failure.

SUMMARY OF THE INVENTION

By contrast, the process according to the invention and the metallic component according to the invention have the advantage that improved carbonitriding of the metallic component is made possible and therefore improved material properties can be achieved.

The process advantageously serves for low-pressure carbonitriding. In this case, the process can serve for carbide-controlled carbonitriding, in which one or more metallic components are produced with a carbide-free or carbide-controlled region close to the surface.

In low-pressure carburization, an increased carbon content may be present at the region close to the surface given surface carbon contents of from approximately 0.5 to 0.7% by mass at edges, threads, bore intersections and the like. This can be attributed to the fact that, owing to the greater carburizable surface with respect to the underlying volume, less carbon can diffuse away from the surface into the volume compared to even surfaces. As a result, carbon concentrations close to or above the solubility limit of the base material are maintained over relatively long times, leading to the formation of carbides which can no longer dissolve during the further heat treatment. Depending on the loading, such carbides close to the surface may lead to premature component failure. The removal of such carbide-rich surface regions, which are critical to failure, by remachining steps, for example grinding, is cost-intensive, however, and cannot always be carried out. Especially in the case of relatively complex geometries, for example bore intersections, such remachining is complicated or possibly even no longer possible.

Since both nitrogen and carbon can be dissolved interstitially in the iron lattice, carbide formation can be influenced by the nitrogen introduced. By way of example, the occupation of interstitial lattice sites with nitrogen atoms before the actual introduction of carbon makes it possible for the maximum possible carbon concentration to be reduced to such an extent that carbide formation can be prevented or reduced.

Therefore, specifically carbide formation in regions close to the surface can be reduced or avoided with the aid of carbonitriding in the case of critical geometries of one or more metallic components, for example in the case of thread turns and bore intersections.

It is advantageous that the metallic component is heated to a treatment temperature in a heating phase, is nitrided with a nitrogen-donating gas in at least one nitriding phase and is carburized with a carbon-donating gas in at least one carburization phase. In this case, at least one nitriding phase is effected before each carburization phase. Carrying out a nitriding phase before each carburization phase has the advantage that the nitrogen introduced reduces the quantity of carbon which can be held in the iron matrix, as a result of which carbide formation is reduced or avoided. Then, at least one further nitriding phase can be effected to reduce the effect whereby nitrogen effuses out of the surface again over time.

It is therefore advantageous that a plurality of carburization phases are provided, and that each carburization phase is assigned a preceding nitriding phase. In this respect, it is furthermore advantageous that provision is made of a heating phase, in which the metallic component is heated to the treatment temperature, and that the heating phase lies before the nitriding phases and the carburization phases. In this respect, the treatment temperature can advantageously lie in a range of approximately 780° C. to approximately 1050° C.

Furthermore, it is advantageous that provision is made of at least one process gas change between a nitriding phase and a subsequent carburization phase, in which the nitrogen-donating gas used in the nitriding phase is displaced using an inert gas and/or that provision is made of at least one process gas change between a carburization phase and a subsequent nitriding phase, in which the carbon-donating gas used in the carburization phase is displaced. Therefore, after each nitriding phase or carburization phase, the treatment chamber or the like can be flushed with an inert gas, for example with nitrogen or argon, for the purpose of the process gas change. It is also possible for the treatment chamber to be evacuated for the process gas change.

The desired carbon and nitrogen concentration distribution in the marginal layer or in the region of the surface of the metallic component can advantageously be set by a suitable selection of the points in time and the durations of the nitriding phases, carburization phases and further phases, in particular diffusion phases. To interpret the overall process, it is advantageously possible to use simulation models which calculate the diffusion of nitrogen and carbon depending on a period of time, a temperature, a material composition and if appropriate further parameters.

It is advantageous that the nitrogen-donating gas contains ammonia and/or nitrogen. Furthermore, it is advantageous that the carbon-donating gas comprises acetylene and/or ethylene and/or propane and/or propene and/or methane and/or cyclohexane and/or cyclopentane.

Furthermore, it is advantageous that provision is made of at least one diffusion phase, in which evacuation is effected and/or in which the metallic component is surrounded at least substantially with an inert gas, and that the diffusion phase follows a nitriding phase or a carburization phase. In this respect, a plurality of diffusion phases may also be provided. In particular, a diffusion phase can be provided after a first nitriding phase and a further diffusion phase can be provided after a final carburization phase. This makes advantageous carbonitriding of the metallic component possible.

Furthermore, it is advantageous that the metallic component is nitrided at least in a surface region at which the surface of the component is not even and therefore, for example, has a protrusion. It is also advantageous that the metallic component is nitrided at least in a surface region at a thread, an intersection, an edge or the like. Therefore, an excessive carbon concentration can be avoided specifically at surface regions of the component at which the surface is relatively large compared to the volume present behind it and therefore an increase in the carbon concentration is promoted in relation to the volume in question. It is thus possible to reduce the maximum possible carbon concentration in order to prevent carbide formation.

BRIEF DESCRIPTION OF THE DRAWINGS

Preferred exemplary embodiments of the invention are explained in more detail in the following description with reference to the accompanying drawings, in which.

DETAILED DESCRIPTION

Figure 1:
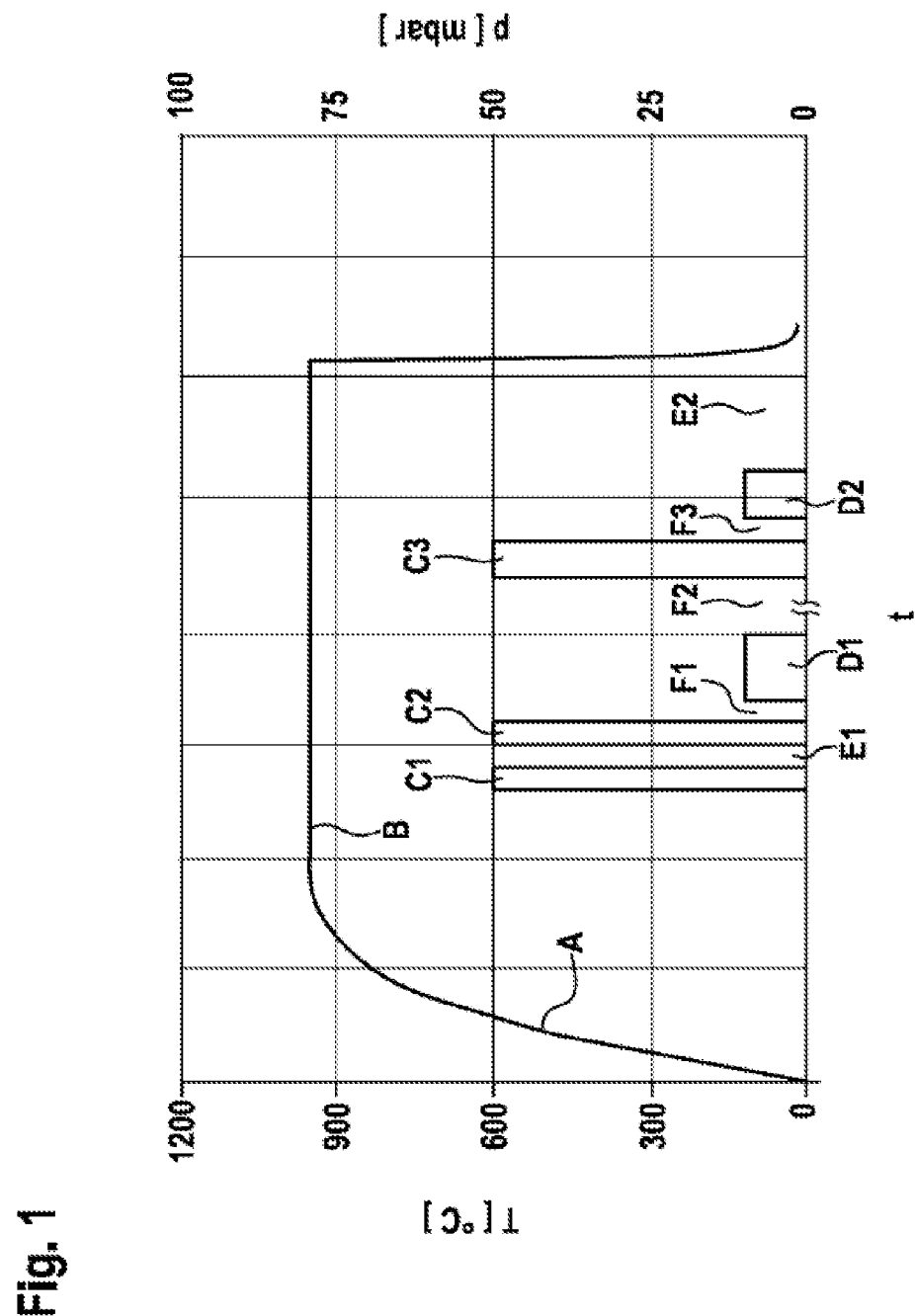
FIG. 1 shows a schematic illustration of a procedure of a process for low-pressure carbonitriding in accordance with an exemplary embodiment of the invention.

FIG. 1 shows a procedure of a process for low-pressure carbonitriding in accordance with an exemplary embodiment of the invention in a schematic illustration. Here, the time t is plotted on the abscissa. The process is carried out on a metallic component 1 (FIG. 3) located, for example, in a treatment chamber. The temperature in the treatment chamber is shown on one side of the ordinate of the graph shown in FIG. 1. The partial pressures of a nitrogen-donating gas and of a carbon-donating gas are plotted on the other side of the ordinate.

The process for low-pressure carbonitriding begins with a heating phase A. In the heating phase, the temperature T is increased to a treatment temperature. The treatment temperature in this exemplary embodiment lies above 900° C. In this case, the treatment temperature can preferably lie in a range of approximately 780° C. to approximately 1050° C. Once the treatment temperature of slightly more than 900° C. has been reached, a temperature equalization phase B follows. This is followed by a nitriding phase C1. In the nitriding phase C1, the partial pressure of a nitrogen-donating gas is increased. The nitriding phase C1 is followed by a diffusion phase E1. The diffusion phase E1 is followed by a further nitriding phase C2, in which the partial pressure of the nitrogen-donating gas is increased again. The nitriding phase C2 is followed by a process gas change F1. The process gas change F1 is followed by a carburization phase D1, in which a partial pressure of a carbon-donating gas is increased. The carburization phase D1 is followed by a process gas change F2. After the process gas change F2, a nitriding phase C3 is carried out, in which the partial pressure of the nitrogen-donating gas is increased. The nitriding phase C3 is followed by a further process gas change F3. The process gas change F3 is followed by a second carburization phase D2, in which the partial pressure of the carbon-donating gas is increased. The carburization phase D2 is followed by a second diffusion phase E2. At the end of the second diffusion phase E2, the temperature is lowered again, i.e. the metallic component 1 is cooled.

Specifically, during the heating phase A the temperature T can be increased at a constant heating rate continuously up to a treatment temperature T of approximately 950° C.

In the temperature equalization phase B, which follows the heating phase A, the treatment temperature is kept constantly at approximately 950° C. During the heating phase A and the temperature equalization phase B, neither a nitrogen-donating gas nor a carbon-donating gas is fed in.

In the first nitriding phase C1, which follows the temperature equalization phase B, a nitrogen-donating gas, for example ammonia, is fed in at a nitrogen-donating gas partial pressure of approximately 50 mbar. This is followed by a first diffusion phase E1, in which the treatment chamber is evacuated or flushed with an inert gas. In this case, nitrogen or argon can serve as the inert gas. This is followed by the second nitriding phase C2, with a nitrogen-donating gas at a nitrogen-donating gas partial pressure of approximately 50 mbar. Ammonia can serve as the nitrogen-donating gas, for example.

This is followed by a first process gas change F1, in which the treatment chamber is evacuated or flushed with an inert gas, for example nitrogen or argon. The first process gas change is followed by a carburization phase D1, with a carbon-donating gas partial pressure of approximately 10 mbar.

The further procedure is carried out accordingly. Here, a second process gas change F2 is made, in which the treatment chamber is evacuated or flushed with an inert gas. During the subsequent nitriding phase C3, a nitrogen-donating gas partial pressure of approximately 50 mbar can in turn be predefined. The subsequent process gas change can in turn be made by evacuation or flushing with the inert gas. The second carburization phase D2 can in turn be carried out at a carbon-donating gas partial pressure of approximately 10 mbar. After the second carburization phase D2, the second diffusion phase E2 is carried out, after which, in this exemplary embodiment, the metallic component 1 is cooled. As the second diffusion phase E2 is being carried out, the treatment chamber can be evacuated or flushed with an inert gas, for example nitrogen or argon.

Therefore, the process in this exemplary embodiment comprises a heating phase A, a temperature equalization phase B, three nitriding phases C1, C2, C3, two carburization phases D1, D2, two diffusion phases E1, E2 and three process gas changes F1, F2, F3 and also a cooling phase.

As the process is being carried out, at least one nitriding phase C1, C2, C3 is carried out before each carburization phase D1, D2. In this exemplary embodiment, the two nitriding phases C1, C2 are carried out before the carburization phase D1, and the nitriding phase C3 is carried out before the carburization phase D2.

Depending on the configuration of the process, further carburization phases can also be carried out. Each of such further carburization phases is preceded in turn by at least one nitriding phase. Diffusion phases or process gas changes are carried out suitably between the individual nitriding phases and carburization phases.

Numerous modifications of the process for carbide-free or carbide-controlled carbonitriding can therefore be carried out in this way. This can advantageously influence the microstructure of the metallic component 1. This advantageous influencing is present especially in the region of edges or other configurations which result in an uneven surface 2 (FIG. 3).

Figure 2:
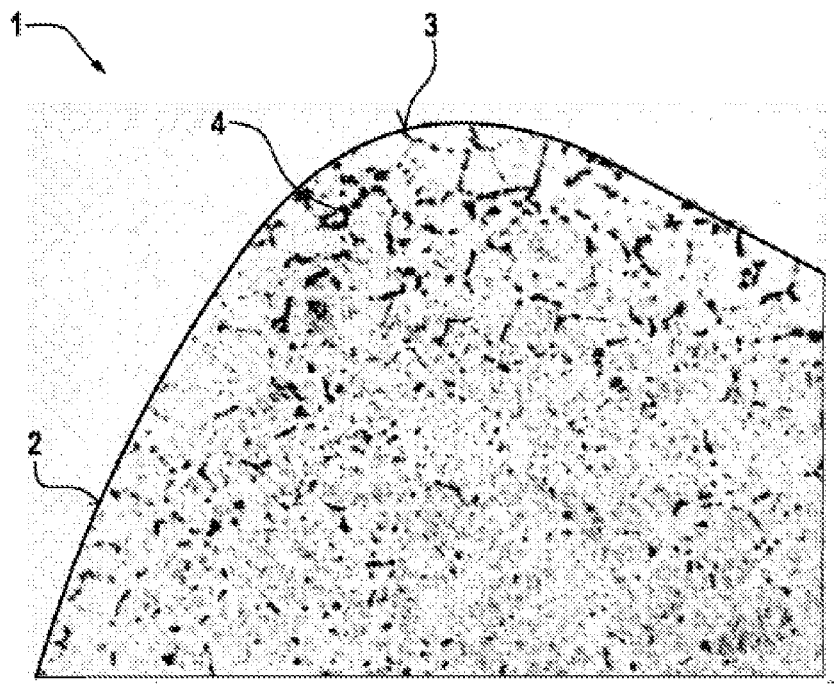
FIG. 2 shows an illustration of a detail of an edge of a metallic component which is produced by a conventional process for carbonitriding.

FIG. 2 shows a schematic, metallographic representation of the microstructure of a carbonitrided edge 3 of a metallic component 1 in a schematic illustration of a detail. Correspondingly, FIG. 3 shows a metallographic representation of the microstructure of a carbide-controlled carbonitrided edge 3 of the metallic component 1 in accordance with the exemplary embodiment of the invention in a schematic illustration.

The edge 3 shown in FIG. 2 has a marginal region 4 with a width of approximately 50 µm under the surface 2 at the edge 3, in which the carbide concentration is elevated. This high carbide concentration at the marginal region 4 has the effect that the load-bearing capacity of the component is unfavorably affected. Specifically, on account of the carbides close to the surface, loading can lead to premature component failure, in which bursting or other mechanical damage occurs in the region of the edge 3.

Figure 3:
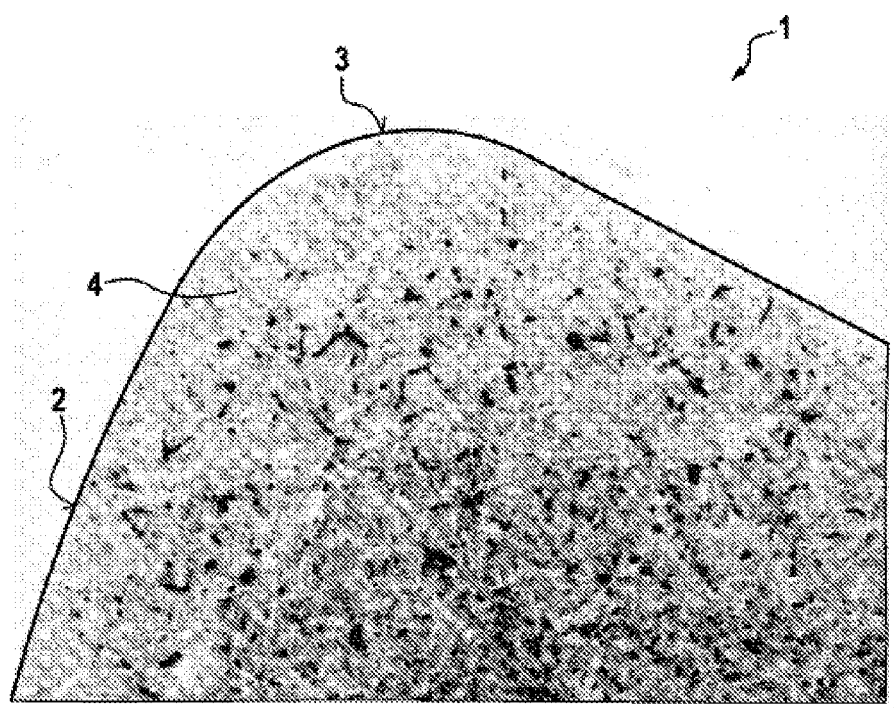
FIG. 3 shows a schematic illustration of a detail of an edge of a metallic component which is produced by the process for carbonitriding in accordance with the exemplary embodiment of the invention.

In the case of the metallic component 1 shown in FIG. 3, the carbonitriding is performed by the process for carbonitriding in accordance with the exemplary embodiment of the invention. This gives rise to a greatly reduced carbide concentration in a marginal region 4 with a width of approximately 15 µm. An undesirably high carbide concentration is thus avoided.

Figure 4:
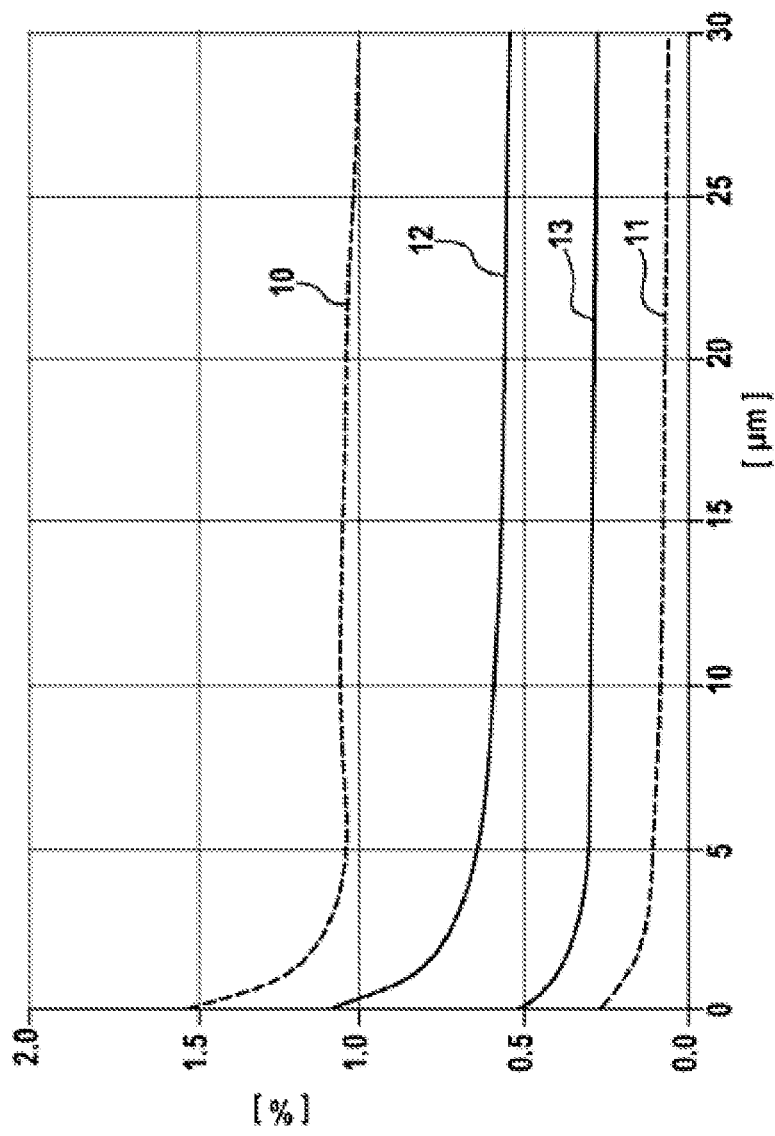
FIG. 4 shows concentration-depth profiles for the metallic components shown in FIGS. 2 and 3 in a schematic illustration for illustrating the exemplary embodiment of the invention.

FIG. 4 shows a depth profile analysis of the components 1 shown in FIG. 2 and FIG. 3 in a schematic illustration. Here, the depth of the marginal region 4 from the surface 2 is shown on the abscissa. Mass concentrations in percent are shown on the ordinate. Here, the curve 10 shown in interrupted form denotes the carbon content of the carbide-containing intersection in the marginal region 4, as arises in the case of the metallic component 1 shown in FIG. 2. The curve 11 shown in interrupted form denotes the nitrogen content of the carbide-containing intersection of the marginal region 4, as arises in the case of the metallic component 1 shown in FIG. 2. The curve 12 denotes the carbon content of the carbide-controlled intersection in the marginal region 4 of the metallic component 1 in accordance with the exemplary embodiment of the invention shown in FIG. 3, and the curve 13 denotes the nitrogen content of the carbide-controlled intersection in the marginal region 4 of the metallic component 1 in accordance with the exemplary embodiment of the invention shown in FIG. 3.

The process for carbonitriding in accordance with the exemplary embodiment of the invention makes it possible for the carbon content in the marginal region 4 at the edge 3 to be lowered considerably, as is shown by comparing the curve 10 for a conventional configuration with the curve 12 for a configuration in accordance with the exemplary embodiment of the invention. At the same time, the nitrogen concentration in the marginal region 4 at the edge 3 is increased by the configuration of the process in accordance with the exemplary embodiment of the invention, as is shown by comparing the curve 11 for conventional implementation with the curve 13 for implementation in accordance with the exemplary embodiment of the invention.

Comparable hardness results can be achieved as a result of the reduction in the carbon concentration combined with the increase in the nitrogen concentration.

It is thus possible in an advantageous manner to influence the microstructure of the metallic component in critical surface regions at which the surface 2 of the component 1 is not even. Specifically, nitriding can be carried out at a thread, at an intersection, at an edge or the like, such that it is possible to advantageously reduce the otherwise excessive carbide concentration. In this respect, it is possible to achieve a high load-bearing capacity along with a required hardness of the metallic component 1 at such critical surface regions.

The process for carbonitriding in accordance with the exemplary embodiment of the invention is especially suitable for components of air-compressing, auto-ignition internal combustion engines or for fuel injection systems of such internal combustion engines. Specifically, components for high-pressure injection pumps, components of diesel injection engines, throttle plates and the like can be produced. Furthermore, the process is also suitable for transmission components.

The invention is not limited to the exemplary embodiments described.

The invention claimed is:

1. A process for carbonitriding a metallic component, comprising:
   heating the metallic component to a treatment temperature;
   conducting a plurality of nitriding phases, including a first nitriding phase and a second nitriding phase, each nitriding phase comprising nitriding the metallic component with an ammonia gas superficially at a surface region of the metallic component;
   conducting a plurality of carburization phases, including a first carburization phase and a second carburization phase, each carburization phase comprising carburizing the metallic component with an acetylene gas;
   wherein each nitriding phase and each carburization phase is performed at the same treatment temperature;
   wherein the metallic component is nitrided in a surface region at which the surface of the component is not even, and/or in that the metallic component is nitrided in a surface region at a thread, an intersection, or an edge and/or in that the metallic component is a transmission component, and/or in that the metallic component has a toothing geometry, at which the surface of the component is nitrided;
   wherein at least one nitriding phase is conducted before each individual carburization phase in the plurality of carburization phases, and wherein the first nitriding phase is conducted before the first carburization phase, which is conducted before the second nitriding phase, which is conducted before the second carburization phase.

2. The process as claimed in claim 1, characterized in that the treatment temperature lies in a range of approximately 780° C. to approximately 1050° C.

3. The process as claimed in claim 1, characterized in that the carbonitriding is low-pressure carbonitriding performed at a pressure of less than about 50 mbar.

4. The process as claimed in claim 1, characterized in that provision is made of at least one process gas change between a nitriding phase and a subsequent carburization phase in which the ammonia gas used in the nitriding phase is removed by evacuation or displaced using an inert gas and/or in that provision is made of at least one process gas change between a carburization phase and a subsequent nitriding phase in which the acetylene gas used in the carburization phase is removed by evacuation or displaced using an inert gas.

5. The process as claimed in claim 1, characterized in that provision is made of at least one diffusion phase, in which evacuation is effected and/or in which the metallic component is surrounded at least substantially with an inert gas, and in that the diffusion phase follows a nitriding phase or a carburization phase.

* * * * *